United States Patent
Bhageria et al.

(10) Patent No.: US 10,223,251 B2
(45) Date of Patent: Mar. 5, 2019

(54) TESTING APPS IN MICRO-FLUIDICS BASED DEVICES

(71) Applicant: International Business Machines Corporation, Armonk, NY (US)

(72) Inventors: Gopal K. Bhageria, Kilkata (IN); Vijay Ekambaram, Tamilnadu (IN); Sarbajit K. Rakshit, Kolkata (IN)

(73) Assignee: International Business Machines Corporation, Armonk, NY (US)

( * ) Notice: Subject to any disclaimer, the term of this patent is extended or adjusted under 35 U.S.C. 154(b) by 164 days.

(21) Appl. No.: 15/333,610

(22) Filed: Oct. 25, 2016

(65) Prior Publication Data

US 2018/0113800 A1    Apr. 26, 2018

(51) Int. Cl.
*G06F 11/00*     (2006.01)
*G06F 11/36*     (2006.01)
(Continued)

(52) U.S. Cl.
CPC .......... *G06F 11/3692* (2013.01); *G06F 3/016* (2013.01); *G06F 3/0416* (2013.01);
(Continued)

(58) Field of Classification Search
CPC .... G06F 3/016; G06F 3/0416; G06F 11/3664; G06F 11/3684; G06F 11/3688; G06F 11/3692
See application file for complete search history.

(56) References Cited

U.S. PATENT DOCUMENTS 9,135,151 B2    9/2015 Betak et al.
9,202,039 B2   12/2015 Dandu et al.
(Continued)

FOREIGN PATENT DOCUMENTS

KR    1020150064063 A    6/2015

OTHER PUBLICATIONS

Xamarin Test Cloud Mobile app testing made easy., Mobile App Testing on Hundreds of Devices—Xamarin Test Cloud, http://www.xamarin.com/test-cloud; pp. 1-9, last download Apr. 22, 2016.
(Continued)

*Primary Examiner* — Joshua P Lottich
(74) *Attorney, Agent, or Firm* — Scully, Scott, Murphy & Presser, P.C.; Scott Dobson, Esq.

(57) ABSTRACT

A method, system and computer program product are disclosed for remotely testing computing devices including dynamic, shapeable tactile touch screens. In an embodiment, a method comprises establishing a communications connection between a computing device under test and a remote testing computer system, the computing device under test including a dynamic, configurable tactile touch screen; and configuring a portion of the touch screen of the computing device under test, in a defined manner, to form three-dimensional physical features on the touch screen for interacting with the touch screen. In an embodiment, the method further comprises transmitting specified information about said configuring, via the established communications connection, from the computing device under test to the remote testing computer system; and generating a defined visual representation on the remote testing computer system, by using the specified information, of said configuring a portion of the touch screen.

20 Claims, 8 Drawing Sheets

(51) Int. Cl.
  *G06F 3/041* (2006.01)
  *G06F 3/01* (2006.01)
  *G06F 3/0488* (2013.01)

(52) U.S. Cl.
  CPC ...... *G06F 3/04886* (2013.01); *G06F 11/3664* (2013.01); *G06F 11/3684* (2013.01); *G06F 11/3688* (2013.01); *G06F 2203/04809* (2013.01)

(56) References Cited

U.S. PATENT DOCUMENTS

| | | | | |
|---|---|---|---|---|
| 9,557,813 | B2* | 1/2017 | Yairi | |
| 9,722,985 | B2* | 8/2017 | Tartz | H04L 63/08 |
| 9,968,840 | B2* | 5/2018 | Czaja | A63C 11/003 |
| 10,013,082 | B2* | 7/2018 | Schecter | G06F 3/041 |
| 2004/0056876 | A1* | 3/2004 | Nakajima | G06F 3/016 |
| | | | | 715/702 |
| 2006/0187197 | A1* | 8/2006 | Peshkin | G06F 3/016 |
| | | | | 345/156 |
| 2007/0013662 | A1* | 1/2007 | Fauth | G06F 3/016 |
| | | | | 345/168 |
| 2008/0059888 | A1* | 3/2008 | Dunko | G06F 1/1613 |
| | | | | 715/744 |
| 2009/0306815 | A1 | 12/2009 | McManus et al. | |
| 2010/0245254 | A1* | 9/2010 | Olien | G06F 3/016 |
| | | | | 345/173 |
| 2014/0098038 | A1* | 4/2014 | Paek | G06F 1/1692 |
| | | | | 345/173 |
| 2014/0160063 | A1* | 6/2014 | Yairi | G06F 3/044 |
| | | | | 345/174 |
| 2014/0160064 | A1* | 6/2014 | Yairi | G06F 3/04895 |
| | | | | 345/174 |
| 2015/0109941 | A1 | 4/2015 | Zhang et al. | |
| 2016/0202761 | A1 | 7/2016 | Bostick et al. | |

OTHER PUBLICATIONS

Soasta Mobile Testing with Touchiest, http://www.soasta.com/mobile-testing, pp. 1-8, last download Apr. 22, 2016.
Perfecto's Continuous Quality Lab is a Testing Tool for Mobile and Web, http://perfectomobile.com/continuous-quality-lab-is-a-testing-tool-for-mobile-and-web, pp. 109, last download Apr. 22, 2016.
"Gemotion Screen", Robot and the Elastic Mind: Projects—Gemotion Screen, http://www.isi.imi.i.u-tokyo.ac.jp/~niiyama/projects/proj_gemotion_en.html; oo, 1-3, last download Apr. 22, 2016.
"Technology . . . or magic? Samsung shows off video of transparent, flexible screen—with 3D so real it looks like you can touch it", http://www.dailymail.co.uk/sciencetech/article-2070741/Samsungs-transparent . . . , Dec. 7, 2011, pp. 1-29, last download Apr. 22, 2016.
"Optimize Mobile App Quality with Agile Testing," Testdroid—Mobile App Testing on Android and iOS Devices, http://testdroid.com, pp. 1-3, last download Apr. 22, 2016.
Emspak, "A Touchscreen You Can Pinch, Poke and Stretch", Mashable, http://mashable.com/2013/04/23/obake-touchscreen/, Discovery News, Apr. 23, 2013, pp. 1-3.
"Welcome to uTest, the professional network for 200,00+ testers", uTest—The Professional Network for Testers, http://www.utest.com, pp. 1-2, last download Apr. 22, 2016.
Johnston, "Microfluidics panel could add physical buttons to a touch screen", Ars Technica, http://arstechnica.com/gadgets/2014/01/new-microfluidics-panel-could-add-physical-buttons-to-a-touch-screen/, Jan. 23, 2014, last Download Sep. 1, 2016.
Nawaz et al., "Unconventional microfluidics: expanding the discipline", RSCPublishing, The Royal Society of chemistry 2013, First published online Mar. 11, 2013.

* cited by examiner

TESTING APPS IN MICRO-FLUIDICS BASED DEVICES

BACKGROUND

This invention generally relates to remote testing of software applications, and more specifically, to remote testing of software applications on computer devices having display screens that have transverse movement.

Due to technological advancements, there are several mobile computing devices that include a transparent overlay in the form of a shapeable, moveable membrane over a display screen. The membrane is movable in a direction perpendicular to the display screen; and bumps, ridges and other shapes can be formed in the membrane, over the display screen. These shapes can be used to simulate knobs, keys and other three-dimensional shapes or structures that can be located and identified by touch. These shapes also provide tactile feedback and provide for greater convenience using the touch screen interface. The moveable membrane can also be manipulated to give other visual cues to a user.

One technology that is being used to provide such overlays is referred to as microfluidics, which refers to the flow of fluids in spaces having dimensions of micrometer size. Other technologies can also be used to provide a transparent, movable and shapeable membrane over the display screen.

These technologies can be used to create physical three-dimensional depth to mobile apps and videos, and the technologies can also be used in gaming apps to create real physical depth to gaming objects. So, testing such apps is very crucial and critical.

There is a particular need for mobile app testing in a cloud computing environment. A cloud computing testing environment enables application testing in multi-platforms and with various configurations, and with a cloud computing testing environment, there is no need to manage devices locally. In addition, a cloud computing testing environment enables parallel testing of an application in multi-platforms for consolidated reports, and provides capabilities as services.

SUMMARY

Embodiments of the invention provide a method, system and computer program product for remotely testing computing devices including dynamic, shapeable tactile touch screens. In an embodiment, the method comprises establishing a given communications connection between a computing device under test and a remote testing computer system, the computing device under test including a dynamic, configurable tactile touch screen; and configuring a portion of the touch screen of the computing device under test, in a defined manner, to form three-dimensional physical features on the touch screen for interacting with the touch screen. In an embodiment, the method further comprises transmitting specified information about said configuring a portion of the touch screen, via the given communications connection, from the computing device under test to the remote testing computer system; and generating a defined visual representation on the remote testing computer system, by using the specified information, of said configuring a portion of the touch screen.

In an embodiment, the system comprises a testing computer system for testing a computing device under test, wherein a given communications connection is established between the computing device under test and testing computer system, the computing device under test including a dynamic, configurable tactile touch screen, and a portion of the touch screen of the computing device under test is configured, in a defined manner, to form three-dimensional physical features on the touch screen for interacting with the touch screen. The testing computer system is configured for receiving specified information about said configuring a portion of the touch screen, via the given communications connection, from the computing device under test; and for generating a defined visual representation on the remote testing computer system, by using the specified information, of said configuring a portion of the touch screen.

Embodiments of the invention enable remote testing apps based on microfluidics based mobile computing devices using a normal desktop app.

DETAILED DESCRIPTION

Figure 1:
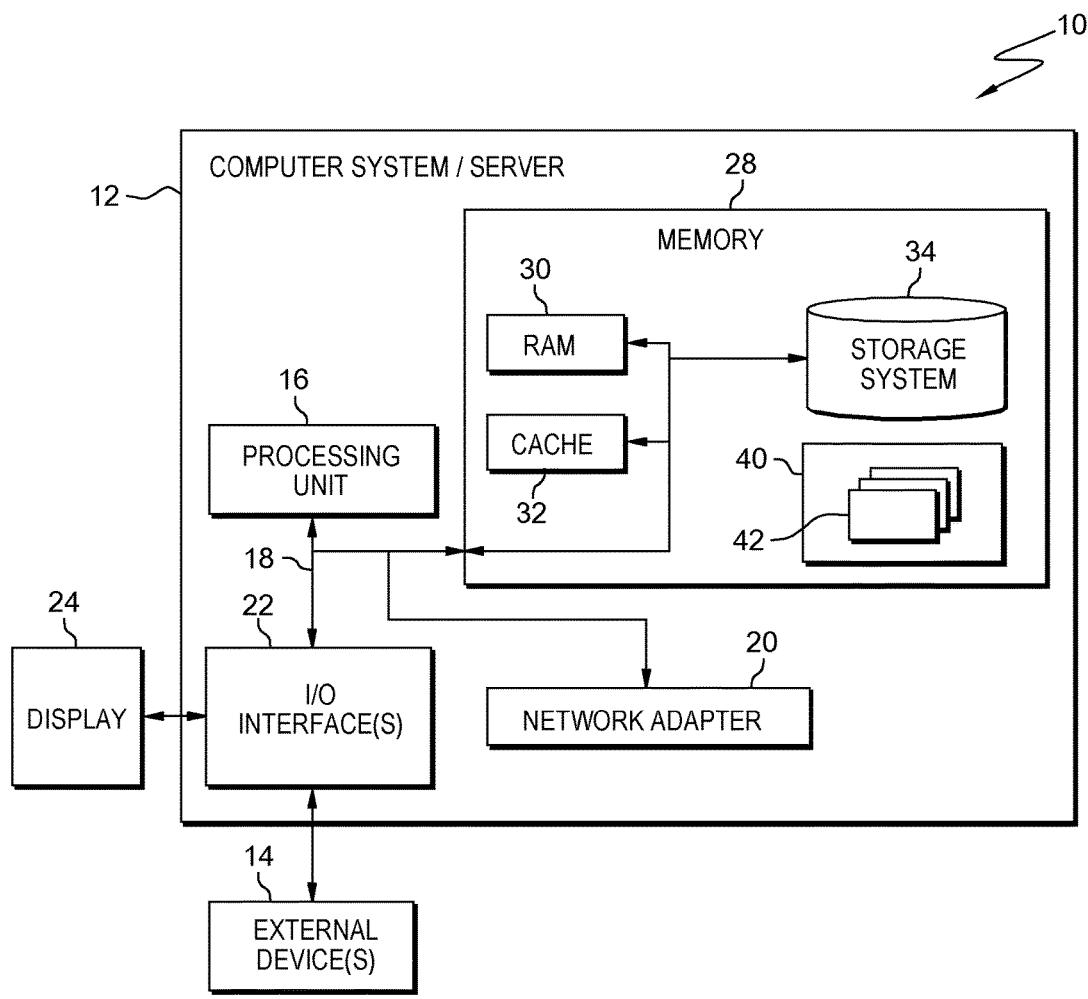
FIG. 1 depicts a cloud computing node according to an embodiment of the present invention.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
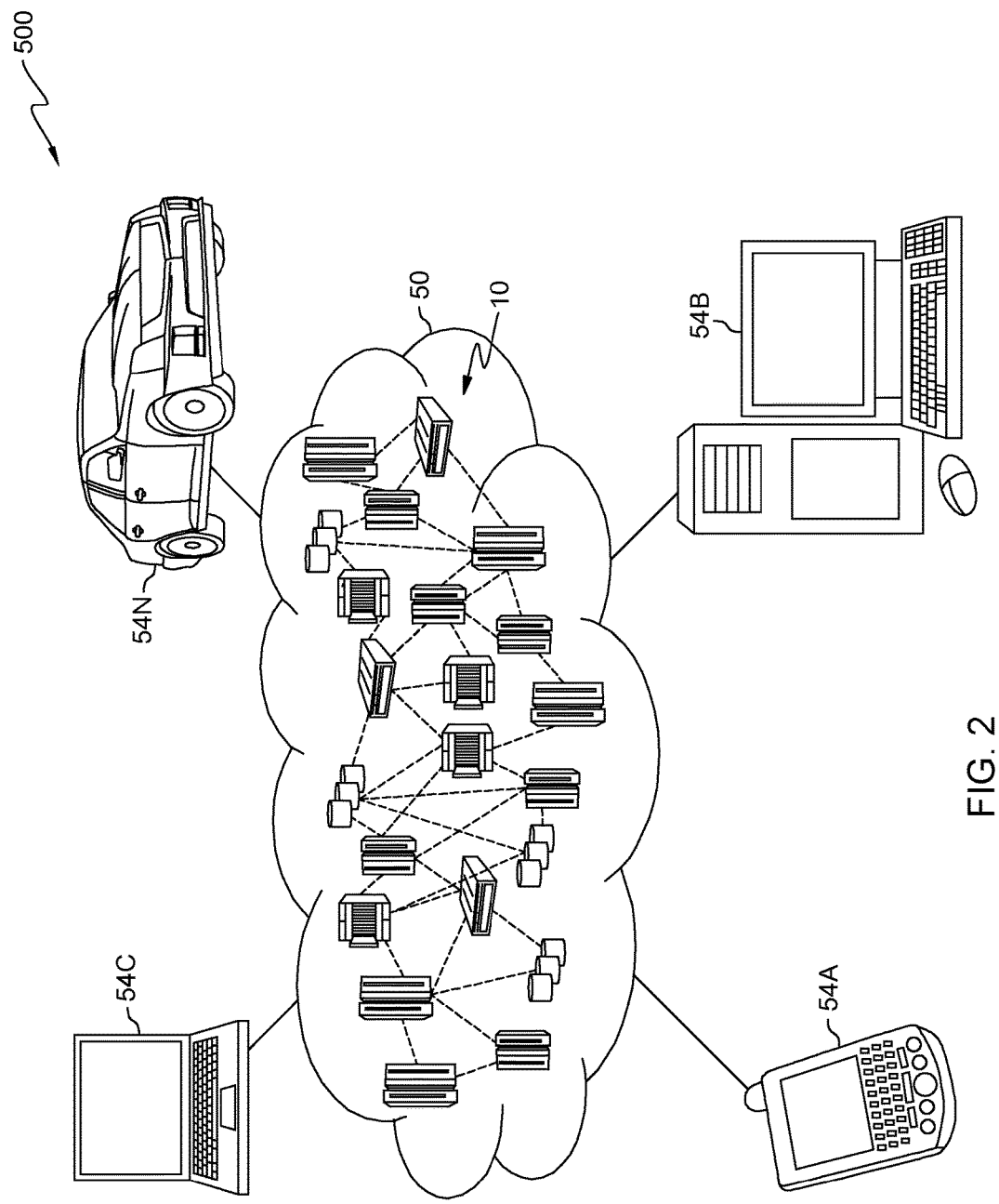
FIG. 2 depicts a cloud computing environment according to an embodiment of the present invention.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
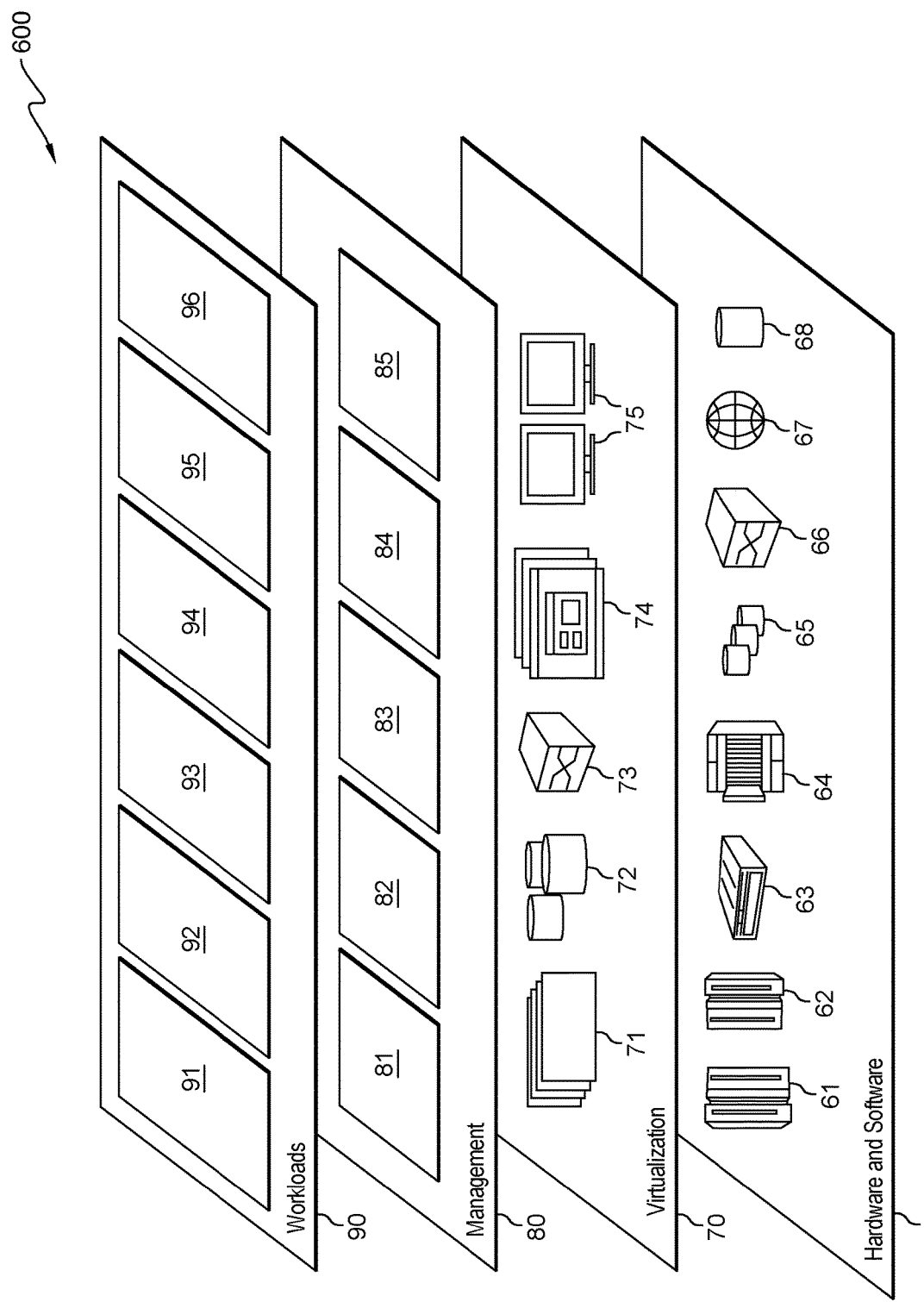
FIG. 3 depicts abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto.

As depicted, the following layers and corresponding functions are provided:

Hardware and software layer 60 includes hardware and software components. Examples of hardware components include mainframes 61; RISC (Reduced Instruction Set Computer) architecture based servers 62; servers 63; blade servers 64; storage devices 65; networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and testing apps in computer devices 96.

Embodiments of the invention use a cloud computing environment to test apps on mobile computing devices, and more specifically, on mobile computing devices having display screens that have transverse movement.

As discussed above, due to technological advancements, there are several mobile computing devices that include a transparent overlay in the form of a shapeable, moveable membrane over a display screen. The membrane is movable in a direction perpendicular to the display screen; and bumps, ridges and other shapes can be formed in the membrane, over the display screen. These shapes can be used to simulate knobs, keys and other three-dimensional shapes or structures that can be located and identified by touch. These shapes also provide tactile feedback and provide for greater convenience using the touch screen interface. The moveable membrane can also be manipulated to give other visual cues to a user.

One technology that is being used to provide such overlays is referred to as microfluidics, which refers to the flow of fluids in spaces having dimensions of micrometer size. Other technologies can also be used to provide a transparent, movable and shapeable membrane over the display screen.

Figure 4:
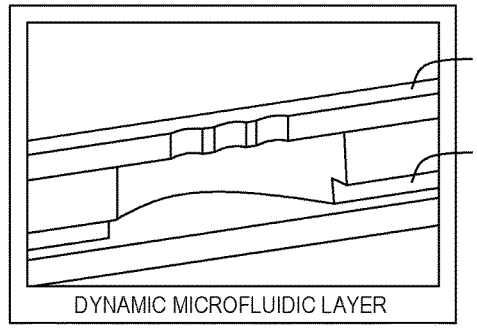
FIG. 4 shows a dynamic microfluidic layer that may be used in a microfluidics based mobile computing device.
Figure 5:
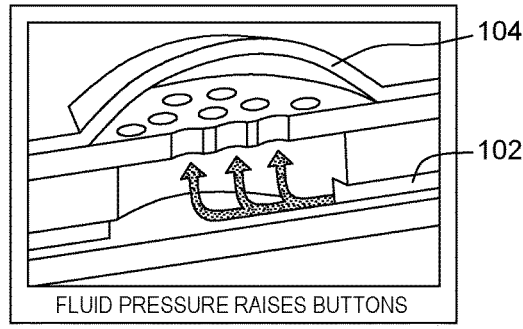
FIG. 5 illustrates the microfluidic layer of FIG. 4 being pushed out to form a bump.
Figure 6:
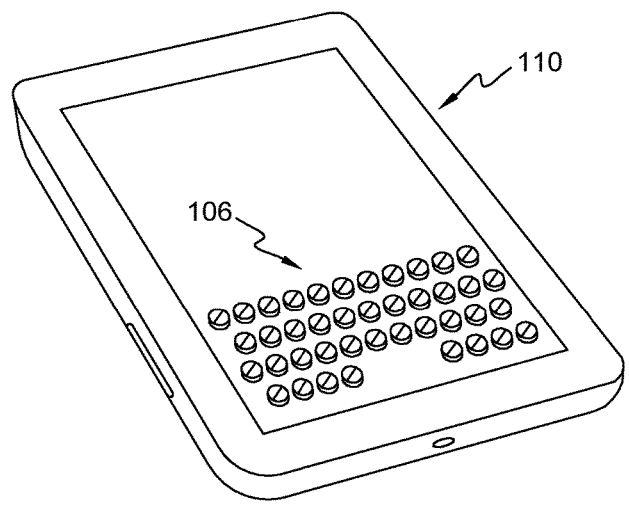
FIG. 6 shows an array of buttons formed on a touch screen of a mobile computing device using microfluidics.

FIGS. 4-6 illustrate the use of a microfluidics based mobile computing device. In this technology, as shown in FIGS. 4 and 5, fluid pressure applied through microchannels 102 is used to raise and lower portions of a membrane 104. This may be used to create ridges, bumps and other three-dimensional features. For instance, as shown in FIG. 6, an array 106 of bumps may be formed on a mobile computing device 110 to represent the keys of a keyboard. Additional details of the use of a microfluidics based membrane on a touch screen display of a mobile computing device are described in U.S. Patent application Publication No. 2016/02022761, the disclosure of which is hereby incorporated herein by reference in its entirety.

Microfluidics technology can be used to create physical three-dimensional depth to mobile apps and videos and can also be used in gaming apps to create real physical depth to gaming objects. Testing such apps will be crucial and critical.

In an embodiment of the invention, devices with applications to be tested are hosted in a cloud computing environment, and the tester gets a handle to interact with the devices in the cloud. Testing these devices in the cloud enables, among other advantages, easy testing of apps in various devices.

Figure 7:
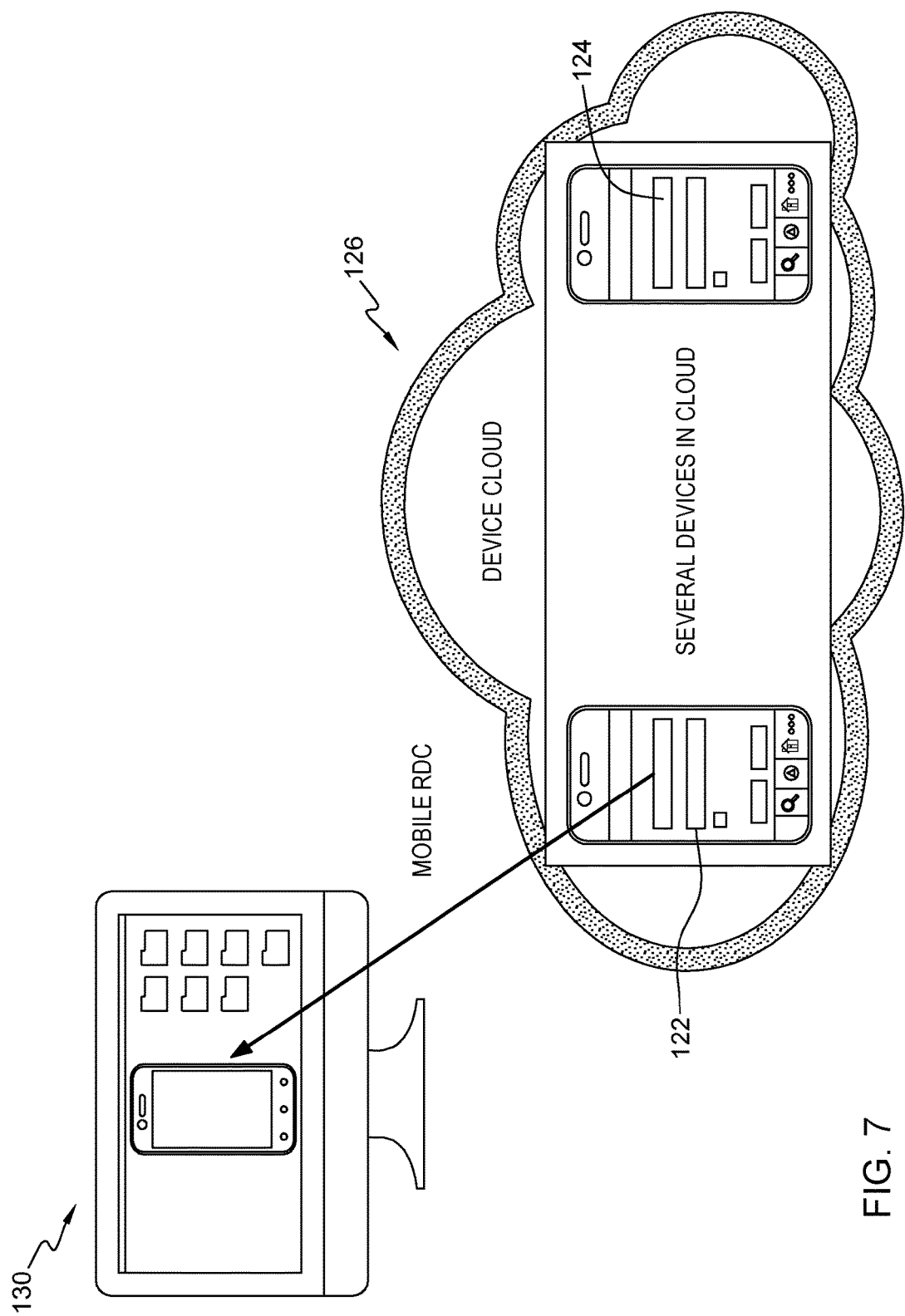
FIG. 7 depicts a remote desktop connected to a device on the cloud by a Remote Desktop Connection

FIG. 7 illustrates a testing environment. FIG. 7 shows a plurality of devices 122, 124 hosted in a cloud computing environment 126, and a tester device 130, which is shown as a desktop computer. The tester 130 synchronizes with a selected device 122 on the cloud, and this may be done using a Mobile Remote Desktop Connection (MRDC).

The Tester 130 has a desktop application which synchronizes with the device 122 in the cloud 126, and the Tester 130 can interact with the device in the cloud through a desktop application. The desktop app shows live mirroring of the selected device's 122 screen, and any user event on the desktop app gets replicated in the synchronized device 122 in the cloud 126.

In embodiments of the invention, The Tester 130 chooses the device 122 in the cloud and synchronizes to it using existing Mobile RDP techniques. The Tester 130 has a desktop application which synchronizes with the device 122 in the cloud and the Tester can interact with the device in the cloud through a desktop application. The desktop app shows live mirroring of the selected device's 122 screen and any user event on the desktop app gets replicated in the synchronized device in the cloud. Since the Tester 130 works with a desktop app which cannot realize microfluidics port flows, the invention uses microfluidic port mirroring technique.

Figure 8:
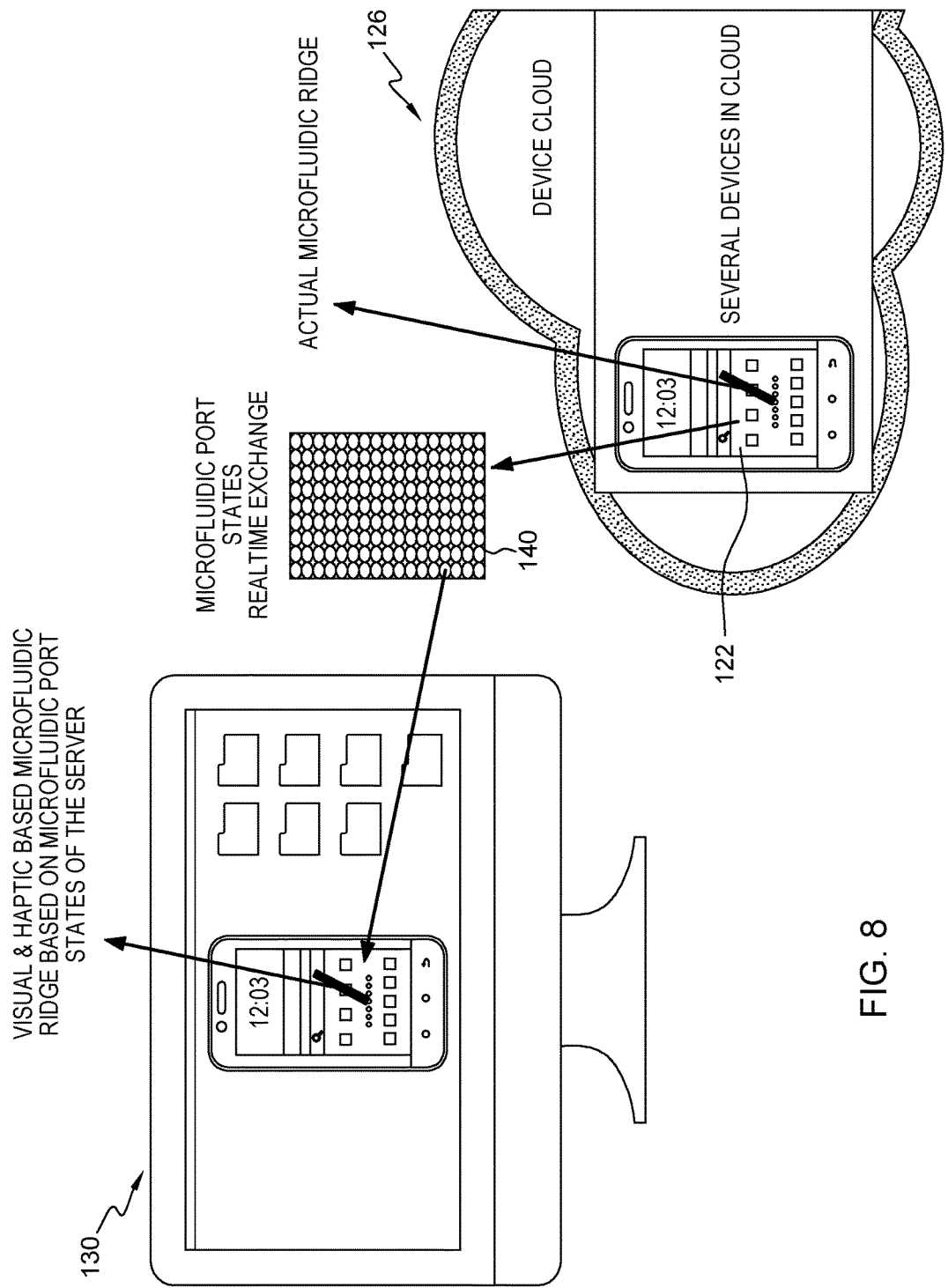
FIG. 8 shows microfluidics port mirroring in a two-dimensional tester device.

With reference to FIGS. 7 and 8, if the Tester client device 130 is two-dimensional—that is, has two-dimensional display capabilities—then the microfluidic port states of the device 122 in the cloud are continuously collected, and a software virtual overlay 140 on top of the client desktop app is created. The virtual overlay 140 represents the microfluidic port states of the device 130 through color and haptic levels. For example, the client desktop app represents the microfludics port state (i.e., fluid pressure, height at every second) as visual color codes with haptic vibrations in the created virtual overlay. With this arrangement, as the fluid pressure and the flow of fluid increase, the haptic vibrations increase. Also, as the height of the micorfluidic port increases, the intensity of the color increases. Since this virtual overlay is overlaid on top of the device screen mirroring the cloud device, a microfluidic based device visualization which is visualized by the tester is created in the desktop app.

Figure 9:
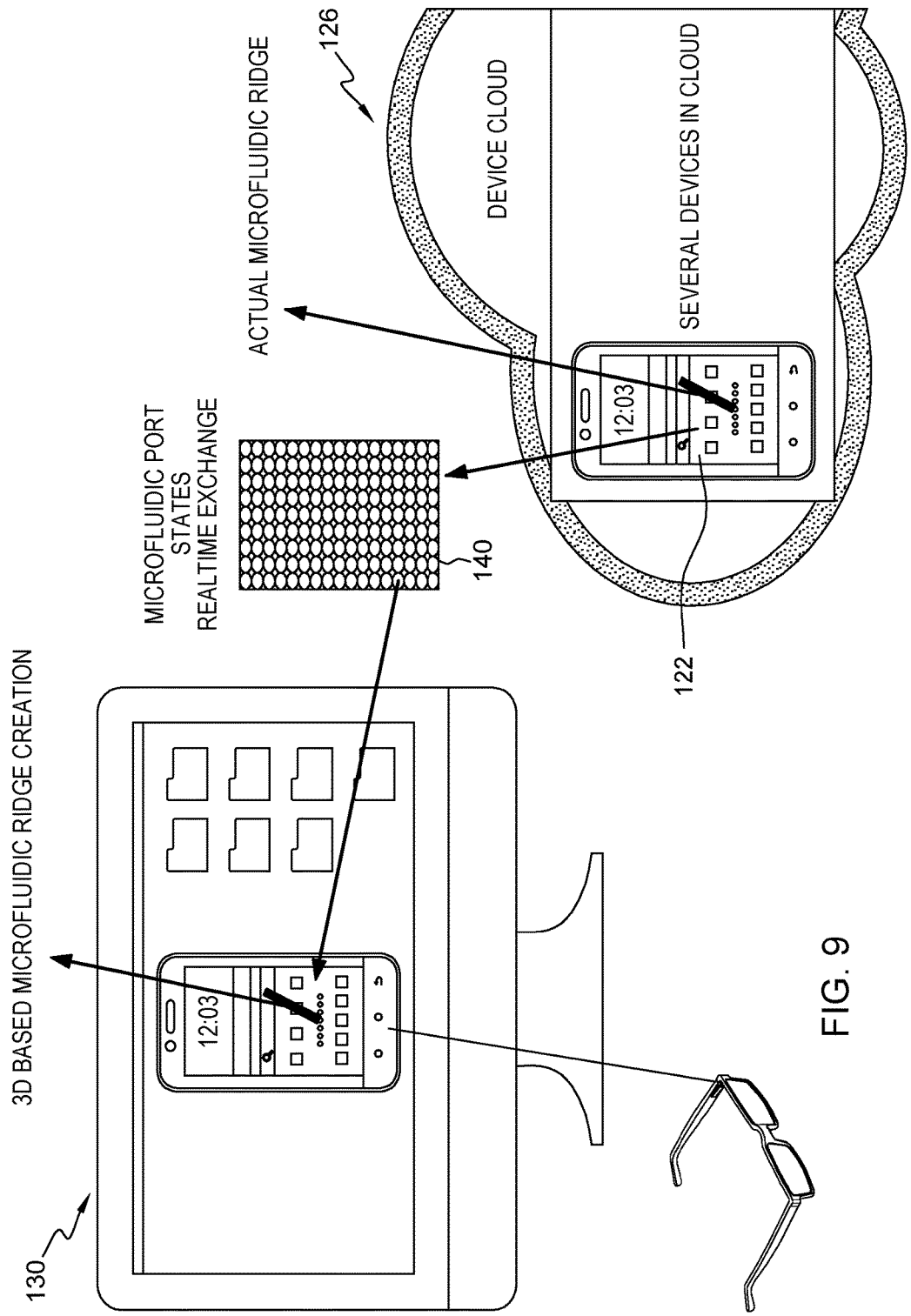
FIG. 9 illustrates microfluidics port mirroring in a three-dimensional tester device.

With reference to FIGS. 7 and 9, if the Tester client device 130 is three-dimensional—that is, has three-dimensional display capabilities—then the microfluidic port states of the device in the cloud are continuously collected, and a three-dimensional virtual overlay 142, which represents the physical depth/height created in each microfluidic port of device, is created as three-dimensional layers. Then, this real-time created virtual overlay is represented as a three-dimensional view using multi-layer three-dimensional techniques. So, when the tester views the desktop app, the tester sees the actual depth/height and flow of microfluidic events that are being replicated in the client desktop app. Whenever the user performs actions on the desktop app, events are captured through the desktop app event handlers, and the captured events are injected into the event bus of the connected microfluidic device 122.

With this embodiment, since the tester device has three-dimensional capability, software converts microfluidics port states to a three-dimensional view (i.e., represents fluidic depth/height using three-dimensional multi-layer techniques), so that the tester can visually see microfluidic port mirroring through three-dimensional effects.

The above steps enable real-time remote testing of apps in microfluidics based devices in the cloud through a normal desktop app.

The device 122 in the cloud can be remotely controlled using a virtual app in the tester's desktop (as shown in FIGS. 8 and 9). FIGS. 8 and 9 show microfluidic port state transfer from the cloud device 122 to the tester's virtual app. Similarly, there is another channel (in the reverse direction) which converts user's interactions on the virtual application in the tester's desktop to actual events on the device 122 in the cloud and executes the action by injecting the events in the event-bus of the mobile device in the cloud. Basically, <pixel, action, event> are the parameters which get mapped between the virtual app and the cloud device for complete interaction.

The device 122 in the cloud knows the complete microfluidic state of all of its microfluidic ports. This information can be obtained by tapping into the device states or event bus. From this information, the height and shallowness of any keys can be measured. This information is transferred to the virtual app, and based on the two-dimensional or three-dimensional nature of the virtual app, suitable microport mirroring techniques as discussed above are enabled.

Figure 10:
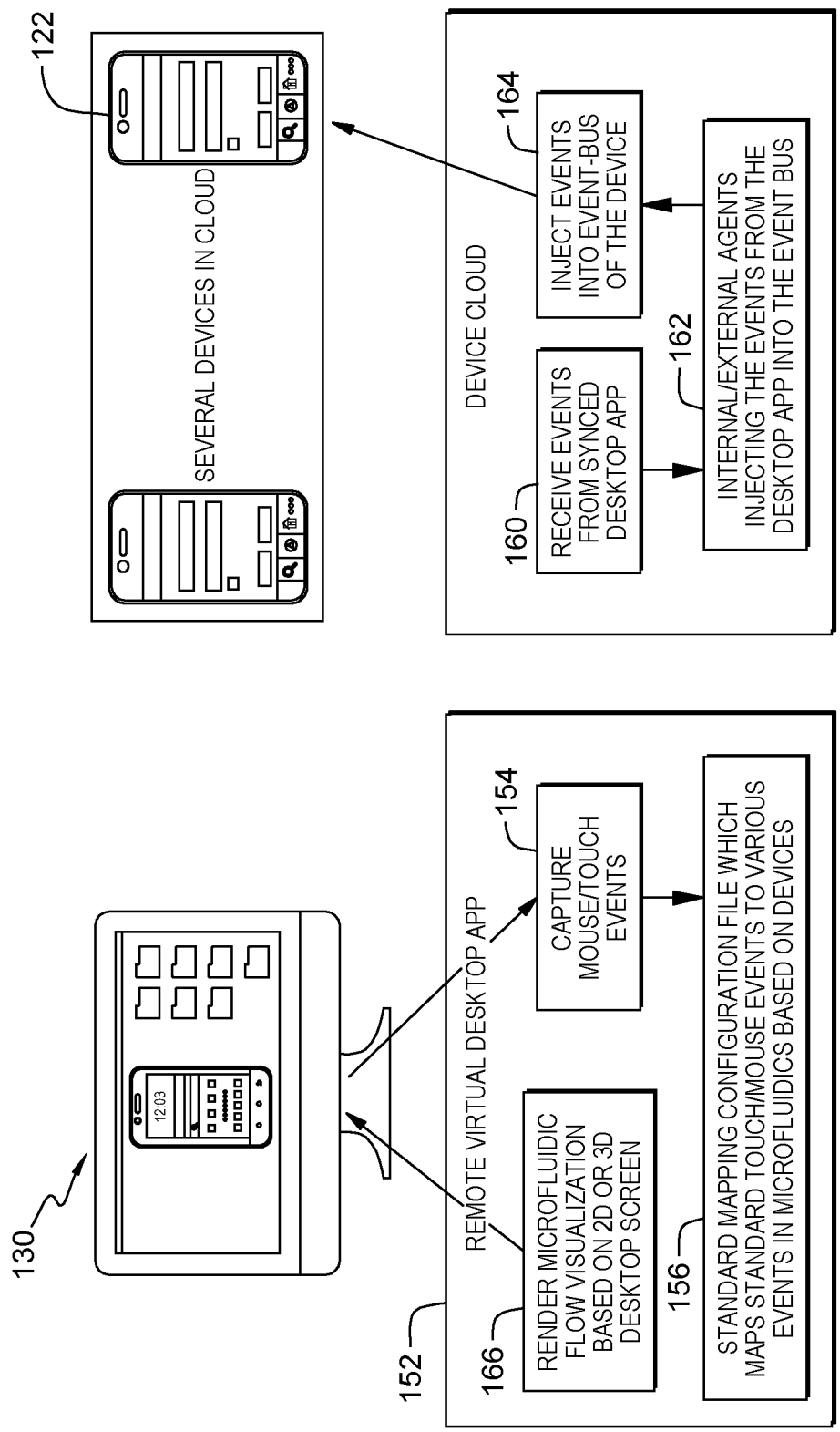
FIG. 10 illustrates a component diagram showing the flow of event injection and event synchronization between a desktop virtual app and a microfluidic mobile computing device in the cloud.

FIG. 10 shows an architecture/component diagram explaining the flow of event injection and event synchronization between the desktop virtual app 152 and the microfluidic device 122 in the cloud. The user interacts with the virtual desktop app, and all user interactions are captured (mouse and touch events) 154. A standard mapping configuration file 156 maps standard touch/mouse events to various corresponding events 160 in microfluidic based devices. For example, a long press on a mouse key may mean high pressure on the microfluidic ports of the device under test). These events are received in the synchronized device in the cloud, and internal or external agents 162 inject these events at 164 into the event bus of the device which get executed on the micro-fluidic device 122 in the cloud. All changes in the microfluidic ports because of the changes on the tester device are captured. The same is replicated in the desktop virtual app using the above-discussed micro-fluidic port mirroring technique, as represented at 166.

A wide variety of communication or computing devices, of various sizes and types, and both mobile and stationary, may be used in embodiments of the invention. For example, mobile devices that may be used in embodiments of the invention may include portable phones, such as cell phones or the like, a smart phone, a Session Initiation Protocol (SIP) phone, a video phone, a portable email device, a thin client, or a portable gaming device. Mobile communication devices may also be, as additional examples, tablet computers and single-purpose mobile devices (such as eBooks). Other computing devices that may be used in embodiments of the invention include, as examples, personal computers, workstations, and laptop computers.

The description of the invention has been presented for purposes of illustration and description, and is not intended to be exhaustive or to limit the invention in the form disclosed. Many modifications and variations will be apparent to those of ordinary skill in the art without departing from the scope of the invention. The embodiments were chosen and described in order to explain the principles and applications of the invention, and to enable others of ordinary skill in the art to understand the invention. The invention may be implemented in various embodiments with various modifications as are suited to a particular contemplated use.

The invention claimed is:

1. A method of remotely testing computing devices including dynamic, shapeable tactile touch screens, the method comprising:
    establishing a given communications connection between a computing device under test and a remote testing computer system, the computing device under test including a dynamic, configurable tactile touch screen;
    configuring a portion of the touch screen of the computing device under test, in a defined manner, to form three-dimensional physical features on the touch screen for interacting with the touch screen;
    transmitting specified information about said configuring a portion of the touch screen, via the given communications connection, from the computing device under test to the remote testing computer system; and
    generating a defined visual representation on the remote testing computer system, by using the specified information, of said configuring a portion of the touch screen.

2. The method according to claim 1, wherein the generating a defined visual representation on the remote testing computer system of said configuring a portion of the touch screen includes generating a two-dimensional representation on the remote testing computer system of said configuring a portion of the touch screen.

3. The method according to claim 1, wherein the generating a defined visual representation on the remote testing computer system of said configuring a portion of the touch screen includes generating a three-dimensional representation on the remote testing computer system of said configuring a portion of the touch screen.

4. The method according to claim 1, wherein:
    the touch screen includes a microfluidics layer including a series of microfluidics ports for applying pressure to a surface of the microfluidics layer;
    the transmitting specified information from the computing device under test to the remote testing computer system includes sending states of values of the microfluidics ports from the computing device under test to the remote testing computer system; and
    the generating a defined visual representation on the remote testing computer system of said configuring a portion of the touch screen includes using the micro-fluidic ports states for generating the defined visual representation.

5. The method according to claim 4, wherein:
    the remote testing computer system generates a display including a visual representation of the device under test;
    the generating a defined visual representation on the remote testing computer system of said configuring a portion of the touch screen further includes creating a virtual overlay on top of the visual representation of the device under test; and
    the using the microfluidics ports states for generating the defined visual representation includes using the virtual overlay to represent the microfluidics ports states of the computing device under test.

6. The method according to claim 1, wherein:
    the dynamically configuring a portion of the touch screen includes applying a pressure to a specified area of the touch screen; and
    the generating a defined visual representation of said configuring include showing a first visual indicator on the remote testing computer system to represent the pressure applied to the specified area of the touch screen.

7. The method according to claim 6, wherein the showing a first visual indicator to represent the pressure applied to the specified area of the touch screen includes changing the first visual indicator as the pressure applied to the specified area of the touch screen changes, to represent the changes to the pressure applied to the specified area of the touch screen.

8. The method according to claim 6, wherein:
    the specified area of the touch screen moves a distance in response to the pressure applied to the specified area; and
    the generating a defined visual representation of said configuring further includes showing a second visual indicator on the remote testing computer system to represent the distance the touch screen moves in response to the pressure applied to the specified area.

9. The method according to claim 8, wherein the showing a second visual indicator on the remote testing computer system to represent the distance the touch screen moves in response to the pressure applied to the specified area includes changing the second visual indicator as the distance the touch screen moves in response to the pressure applied to the specified area of the touch screen changes, to represent the changes to the distance the tough screen moves in response to the pressure applied to the specified area of the touch screen.

10. The method according to claim 1, wherein:
    the remote testing computer system generates a display including a visual representation of the device under test; and
    the generating a defined visual representation on the remote testing computer system of said configuring a portion of the touch screen includes
        creating a virtual overlay on top of the visual representation of the device under test, and
        using the virtual overlay to show the configuring a portion of the touch screen.

11. A system for remotely testing computing devices including dynamic, shapeable tactile touch screens, the system comprising:
  a testing computer system for testing a computing device under test, wherein a given communications connection is established between the computing device under test and testing computer system, the computing device under test including a dynamic, configurable tactile touch screen, and a portion of the touch screen of the computing device under test is configured, in a defined manner, to form three-dimensional physical features on the touch screen for interacting with the touch screen; and
  wherein the testing computer system is configured for
    receiving specified information about said configuring a portion of the touch screen, via the given communications connection, from the computing device under test; and
    generating a defined visual representation on the remote testing computer system, by using the specified information, of said configuring a portion of the touch screen.

12. The system according to claim 11, wherein the testing computer system is configured for generating a two-dimensional representation of said configuring a portion of the touch screen.

13. The system according to claim 11, wherein the testing computer system is configured for generating a three-dimensional representation of said configuring a portion of the touch screen.

14. The system according to claim 11, wherein the touch screen of the device under test includes a microfluidics layer including a series of microfluidics ports for applying pressure to a surface of the microfluidics layer, and wherein:
  the testing computer system is configured for receiving from the device under test states of values of the microfluidics ports, and for using the microfluidics ports states for generating the defined visual representation.

15. The system according to claim 11, wherein the testing computer system is configured for:
  generating a display including a visual representation of the device under test;
  creating a virtual overlay on top of the visual representation of the device under test, and
  using the virtual overlay to show the configuring a portion of the touch screen.

16. A computer program product for remotely testing computing devices, wherein a computing device under test includes a dynamic, shapeable tactile touch screen, and a portion of the touch screen of the computing device under test is configured, in a defined manner, to form three-dimensional physical features on the touch screen for interacting with the touch screen, the computer program product comprising:
  a non-transitory computer readable storage medium having program instructions embodied therein, the program instructions executable by a computer to cause the computer to:
  receive specified information about said configuring a portion of the touch screen from the computing device under test; and
  generating a defined visual representation on the remote testing computer system, by using the specified information, of said configuring a portion of the touch screen.

17. The computer program product according to claim 16, wherein the program instructions are executable by the computer to cause the computer to generate a two-dimensional representation of said configuring a portion of the touch screen.

18. The computer program product according to claim 16, wherein the program instructions are executable by the computer to cause the computer to generate a three-dimensional representation of said configuring a portion of the touch screen.

19. The computer program product according to claim 16, wherein the touch screen of the device under test includes a microfluidics layer including a series of microfluidics ports for applying pressure to a surface of the microfluidics layer, and wherein the program instructions are executable by the computer to cause the computer:
  to receive from the device under test states of values of the microfluidics ports; and
  to use the microfluidics ports states for generating the defined visual representation.

20. The computer program product according to claim 16, wherein the program instructions are executable by the computer to cause the computer:
  to generate a display including a visual representation of the device under test;
  to create a virtual overlay on top of the visual representation of the device under test, and
  to use the virtual overlay to show the configuring a portion of the touch screen.

* * * * *